United States Patent
Sato et al.

(10) Patent No.: US 7,395,284 B2
(45) Date of Patent: Jul. 1, 2008

(54) STORAGE SYSTEM

(75) Inventors: Eiichi Sato, Hiratsuka (JP); Masafumi Nozawa, Odawara (JP); Kyosuke Achiwa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 11/038,227

(22) Filed: Jan. 21, 2005

(65) Prior Publication Data
US 2006/0129608 A1 Jun. 15, 2006

(30) Foreign Application Priority Data
Nov. 25, 2004 (JP) ............................. 2004-339827

(51) Int. Cl.
*G06F 17/30* (2006.01)
(52) U.S. Cl. .................. 707/204; 707/200; 707/102
(58) Field of Classification Search ................. 707/204
See application file for complete search history.

(56) References Cited

U.S. PATENT DOCUMENTS

| | | | | |
|---|---|---|---|---|
| 6,976,145 B1 * | 12/2005 | Bradford | .................. | 711/170 |
| 7,036,043 B2 * | 4/2006 | Martin et al. | .................. | 714/19 |
| 7,149,787 B1 * | 12/2006 | Mutalik et al. | .............. | 709/217 |
| 2003/0188233 A1 * | 10/2003 | Lubbers et al. | ............. | 714/100 |
| 2003/0221075 A1 * | 11/2003 | Achiwa et al. | .............. | 711/162 |
| 2004/0153719 A1 * | 8/2004 | Achiwa et al. | ................ | 714/5 |
| 2006/0020640 A1 * | 1/2006 | Suzuki et al. | ............... | 707/201 |
| 2006/0069888 A1 * | 3/2006 | Martinez | .................... | 711/162 |

* cited by examiner

*Primary Examiner*—Don Wong
*Assistant Examiner*—Binh V Ho
(74) *Attorney, Agent, or Firm*—Reed Smith LLP; Stanley P. Fisher, Esq.; Juan Carlos A. Marquez, Esq.

(57) ABSTRACT

There is provided a technique in which such a configuration as to include storage apparatuses on a plurality of sites can reduce a burden of operation/management of backup of data stored in the storage apparatuses. The configuration includes a information processing system on each site to be a backup target, and an information processing system for executing a backup process. Through control of a management server and a process for a backup server at a backup execution point, backup data of the data stored in the storage apparatus of the information processing system is converged into the storage apparatuses of the information processing systems by a process using a remote copying function and stored in the backup device. Then, instructions are given from the management server to the respective sites with synchronized timing, and convergence and storage of said backup data are executed by obtaining a temporal synchronization.

16 Claims, 8 Drawing Sheets

STORAGE SYSTEM

CROSS-REFERENCE TO RELATED APPLICATION

The present application claims priority from Japanese patent application No. JP 2004-339827 filed on Nov. 25, 2004, the content of which is hereby incorporated by reference into this application.

BACKGROUND OF THE INVENTION

The invention relates to a storage system (or an information processing system), which is broadly configured as so to include a storage apparatus (also referred to as "disk array subsystem") controlling memory of data with respect to a memory area in a memory unit and, more specifically, to a technique for backing up data stored in the storage apparatus.

In a conventional configuration as a storage system, an information processing system configured so as to include a storage apparatus has been provided for each of a plurality of remotely spotted sites. In the respective information processing systems, an access for an input/output of data is made to a storage apparatus from a host device such as a business server, whereby the data is stored in a storage volume in the storage apparatus. The business server performs online businesses while storing data in the storage apparatus. The data stored in the storage apparatus of each information processing system may be associated with each other in some cases. As an example, such a storage system includes a storage system which has an information processing system in a headquarters of an enterprise and information processing systems provided in respective divisions remotely located therefrom. In the above storage system, the information processing system of each site backs up data stored in the storage volume of the storage apparatus.

In this case, conventionally, a backup system is provided for each of the information processing systems on the remotely spotted sites, and the data stored in the storage apparatus is backed up by the respective backup systems. For example, in an information processing system on a site such as a computer system of an intra-enterprise LAN (Local Area Network), there are provided a backup server for backing up data stored in a recording medium, and a backup unit for storing the backed up data in a storage apparatus in accordance with the backup process. A manager responsible for backup management in the backup systems, such as a system administrator of the information processing system, sets up the backup process. The backup system executes the backup process with backup executing timing based on the above settings etc.

SUMMARY OF THE INVENTION

In the above conventional storage system and the backup system, the manger responsible for the backup management performs backup-related work such as grasping of backup conditions, restoring data from backup data, maintenance of the backup system, etc. In particular, for each site, after carrying out the work such as a construction of a backup system, definition of a backup rule, and establishment of a backup schedule, the manager requires, in a daily backup operation, grasping the backup condition such as on which site and when the backup is obtained, how long it takes to obtain it, whether the backup process is normally conducted, etc.

However, execution of the backup management for backup systems on the plurality of sites imposes a heavy burden on the manager. In addition, if the backup operation is independently implemented on each site, an operational management task such as backup schedule management becomes troublesome. If the respective information systems on the plurality of sites are backed up separately, one or more manager requires performing the above backup-related work. For example, if one manager executes the backup processes on the plurality of sites, the burden is imposed on the manager because the manger performs the work while grasping the backup conditions on the respective sites. In addition, for example, if the backup management is implemented by the manager on each site and the information processing systems on the respective sites are associated with each other and are associated also with the backups, the burden is imposed on the manager because the manager requires grasping associations of the backup conditions on the plurality of sites.

The present invention is made in view of the above problems and an object thereof is to provide a technique for easing burdens of operating and managing the backups in a system, which has information processing systems configured so as to include storage apparatuses on the plurality of sites and is configured so as to operate/manage the backups of data stored in the storage apparatuses.

Outlines of representative ones of inventions disclosed in the present application will be briefly described as follows. In order to achieve the above object, a storage system of the present invention is a system in which: the storage system has information processing systems configured so as to include storage apparatuses on a plurality of sites; each of the storage apparatuses has a memory unit such as a hard disk drive, and a controller that controls storage of data to the memory unit and is capable of RAID control; and the storage apparatuses on the plurality of sites are connected through a communication means, and is characterized by the following technical means.

The storage system comprises a means of backing up, as a backup target, data stored in the storage apparatuses of the information processing systems on the plurality of sites, into the information processing system on one site with the temporally synchronized timing. In the backup process by this means, by substantially synchronizing the timing of executing the backup processes intended for the plurality of sites, respective backup data are transferred through the communication means, converged into and stored in the information processing system on the one site. The system has a first information processing system that executes the backup and stores the backed up data on one first site, and a second information processing system to be a backup target on one or more second site.

The first information processing system obtains the backup data from the storage data in the storage volume of the second storage apparatus contained in the second information processing system, for example in the storage volume of the first storage apparatus contained in the first information processing system, and stores the obtained backup data. The second storage apparatus has the storage volume or data to be a backup target, and the first storage apparatus has the storage volume for storing the respective pieces of backup data. In addition, for example, the respective pieces of backup data obtained into the first storage apparatus is transferred to the backup device contained in the first information processing system, and stored in the memory area of a recording medium for backup.

The first storage apparatus executes, for example, a process for obtaining the backup data of the data stored in the second storage apparatus through the communication means, and the second storage apparatus executes, for example, a process for transferring, to the first information processing system, the backup data of the data stored in the storage volume to be a backup target. In the respective second information processing systems, the host device such as a business server, for example, executes the routine process such as an online business process, while making the access to the second storage apparatus for data input/output. When the respective backup data is collected into the first information processing system from the second information processing system, there is used the data copying means in which the backup data is created by copying the data to be a backup target in the second storage apparatus and the created backup data is transferred into the first information processing system through the communications means. Using the data copying means, the respective backup data is obtained in the storage volume in the first storage apparatus, for example. The first and second storage apparatuses and other devices contained in the first and second information systems are provided with functions of configuring the data copying means. The first and second storage apparatuses have functions of remote copying between the storage apparatuses, as the data copying means.

The first information processing system starts execution of the backup process at the temporal backup execution point, and, by using the data copying means, converges the backup data of the stored data from the second storage apparatus of the one or more second information processing system, for example, into the first storage apparatus in the first information processing system within almost the synchronized time on the respective sites and obtains the converged backup data. Then, the obtained respective backup data are stored in the backup device contained in the first information processing system. It is possible to integrate, in a consolidated manner the backup operation/management on the plurality of sites into one site, i.e., the first information processing system, by temporally synchronizing the backup processes intended for the plurality of sites, i.e., by synchronizing the start timing or/and the backup process time.

In the backup process, at the temporal backup execution point in accordance with setting of the backup schedule, etc., the first information processing system gives an instruction to execute backup with synchronized timing, to the second information processing system on one or more second site to be a backup target. Then, with the synchronized timing in accordance with the instruction, between the respective second information processing systems and the first information processing system, the backup data of the data stored in the second storage apparatus is processed so as to be converged into the first information processing system. That is, the backup data is transferred from the respective second storage apparatuses through the communication means and the data copying means to the first information processing system.

In addition, the first information processing system controls the process for obtaining individual pieces of backup data in the first storage apparatus by the backup server etc., or/and the process for transferring the backup data from the first storage apparatus, to the recording medium of the backup device, and storing the transferred backup data. The first storage apparatus or/and the backup device write the respective pieces of backup data into the memory area in accordance with control of the backup server or/and the first storage apparatus, etc. The backup device may be a magnetic tape device or magnetic tape library device that writes/reads data to/from a magnetic tape medium. The respective pieces of backup data are separated in the memory area so that each of them can be used independently.

In addition, for example, the remote copying function of executing the remote copying process by the copy pair control between the storage apparatuses without interposing the process by the host device is used as the data copying means. When the backup process is done, the storage volume serving as a copy source in the first storage apparatus and the storage volume serving as a copy destination in the second storage apparatus are set as a copy pair between the first and second storage apparatuses provided with the remote copying functions. Then, between the first and second storage apparatuses through the communication means, the data is remotely copied from the copy-source storage volume to the copy-destination storage volume by exercising control of the copy pair, i.e., exercising control such as pair split or pair synchronization. The backup data is directly transferred from the second storage apparatus, through a communication path for remote copying, to the first storage apparatus. The remote copying process transfers the backup data of the pieces of data stored in the respective second storage apparatuses, to the first storage apparatus. The remote copying process enables the backup process, even when the second storage apparatuses are normally operating in the respective second information processing systems, for example, when they are executing the online businesses while making accesses to the second storage apparatuses from the host device for data input/output. In addition, the backup data to be converged into the first information processing system may include the differential data between the copy-source storage volume and the copy-destination storage volume when the differential backup scheme is used.

The communication means can be a first network such as a WAN (Wide Area Network) that can communicate control system information for controlling the instructions to executing the backup between the respective information processing systems or the convergence of the backup data, or for grasping the conditions of the respective storage apparatuses, and a second network such as a SAN (Storage Area Network) that enables the data copying process using the data copying means between the respective information processing systems, i.e., communication for convergence of the backup data, etc. In addition, the respective information processing systems are composed of the respective devices connected to the LAN, wherein the respective devices are composed of a communication interface unit that executes a communication process associated with the communication means.

If two or more second storage apparatuses are provided as backup targets at the backup execution point, each piece of backup data is obtained from these second storage apparatuses to, for example, the first storage apparatus within almost the synchronized time. In addition, when the first information processing system is included in the backup target, the respective pieces of backup data are obtained at the backup execution point from the one or more second storage apparatus and the first storage apparatus to, for example, the first storage apparatus within almost the synchronized time.

The first information processing system has a management means that executes the processes such as integrated control of the entire backup process, instructions, and settings, etc., or the process for grasping the conditions of the units in the information processing systems in the respective sites. The management means may be configured so as to be provided as an independent management server or provided in the first storage apparatus or the backup server. The management means gives the instructions to the information processing systems on the respective sites in order to executing backup with the synchronized timing. A manager responsible for backup operation/management related to the first and second sites, e.g., a manager who is in charge of the entire backup management gives an instruction to execute the backup process or set the backup schedule to the management means. In accordance with the setting of the backup schedule, etc., the control information for the backup process is sent from the management means to the devices in the information processing system on the respective sites at the backup execution point.

Effects obtained from representative ones of inventions disclosed in the present application will be briefly described as follows. According to the present invention, a burden of backup operation/management can be alleviated in the system having the information processing systems composed to include the storage apparatuses on the plurality of sites and configured to implement backup operation/management of the data stored in the storage apparatuses. By executing the backup processes synchronous with one site rather than the plurality of sites, the backup operation/management with almost the same timing without depending on the conditions of the respective sites is possible.

DESCRIPTION OF THE PREFERRED EMBODIMENTS

Figure 1:
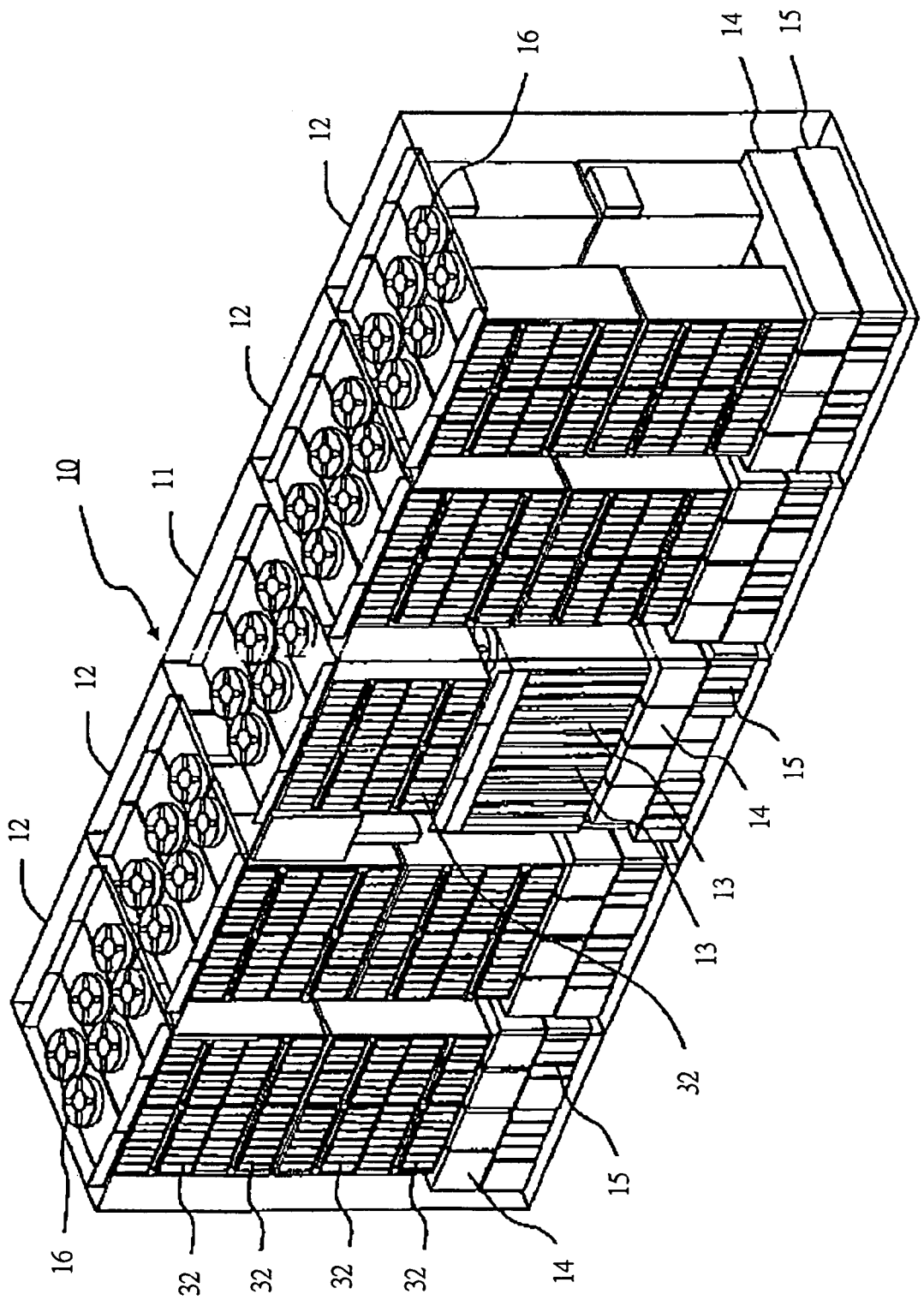
FIG. 1 is a perspective view showing an external configuration of hardware in a storage apparatus in a storage system that is one embodiment of the present invention.

Hereinafter, embodiments of the present invention will be detailed based on the drawings. Note that throughout all the drawings for explaining the embodiments, the same members are denoted in principle by the same reference numerals and a repetitive description thereof will be omitted.

FIGS. 1 to 8 are views for explaining a storage system that is a typical embodiment of the present invention. In the present embodiment, a storage system has information processing systems configured so as to include storage apparatuses on a plurality of sites and is configured so that the respective information processing systems are connected through a communication means, wherein the storage system has a first information processing system on a first site, which executes main control of a backup process, and a second information processing system on a second site, which has data to be a backup target. The first information processing system contained on the first site has: a management server that controls the entire backup process; a first storage apparatus that converges and obtains backup data from the respective sites; a backup device that stores the converged backup data; and a backup server that controls not only convergence of the backup data but also a process for storing the converged backup data from the first storage apparatus to the backup device. The second information processing system contained on the second site has a second storage apparatus, wherein data to be a backup target is stored in a storage volume of the second storage apparatus.

In the first information processing system, at a temporal backup execution point, an instruction of a backup process is issued with the same timing from the management server to a plurality of second information processing systems contained on the second site. While being temporally synchronized based on the instruction, the backup data of data stored in the respective storage apparatuses is converged to and obtained in the first storage apparatus by a remote copying function between the storage apparatuses. Then, in the first information processing system, the backup data obtained from the respective sites is stored in a memory area in the backup device through a process of the backup server.

<Hardware Configuration>

FIG. 1 is a perspective view showing an external configuration of hardware in a storage apparatus 10 in a storage system that is one embodiment of the present invention. The storage apparatus 10 can be configured by a basic chassis 11 and a plurality of additional chassis 12, for example. The basic chassis 11 is a minimum component unit of the storage apparatus 10 and is provided with both of a control function assumed by a controller (control unit) etc. and a storage function assumed by a memory unit. The control function is a function of controlling storage of data with respect to a memory area in the memory unit in accordance with a command or request from a host device etc. The controller is configured by, for example, control packages 13 interconnected per function. The storage function is a function of storing data such as use data in the memory area. In this embodiment, a disk drive 32 serving as a memory unit provides the memory area. Each additional chassis 12 is an optional unit of the storage apparatus 10 and has a storage function. Each additional chassis 12 is controlled by the control function that the basic chassis 11 has. For example, there is possible a configuration in which the four additional chassis 12 are connected to the basic chassis 11. Respective chassis are connected therebetween by communication cables.

In the basic chassis 11, a plurality of control packages 13, a plurality of power units 14, a plurality of battery units 15, and a plurality of disk drives 32 are detachably provided, respectively. In addition, a plurality of cooling fans 16 are respectively provided on a top of each chassis. The power units 14 supply power to the respective units in the chassis. The battery units 15 function as backup power. The cooling fans 16 cool down an interior of each chassis. The disk drive 32 is a device that stores data in a disk area and provided with a mechanical structure for attaching each chassis.

The control packages 13 are modules that implement various units such as a channel adapter (CHA) and a disk adapter (DKA) as described later, respectively. The control packages 13 are units, each of which adds a mechanical structure for attaching the chassis to a board incorporating some functions. In the basic chassis 11, a plurality of CHA packages, a plurality of DKA packages, and one or more memory package, etc. are detachably provided, respectively, as the control package 13 and can be replaced in units of the control package 13. Each control package 13 is inserted into a slot provided in the chassis, and is connected to a board (referred to as "backplane board") for interconnecting the respective units within the slot. To the additional chassis 12, a number of disk drives 32 can be attached in parallel.

Besides, in the storage apparatus 10, a SVP (service processor) having functions of making maintenance and management of the storage apparatus 10, etc. is also connected to the controller, thereby allowing various maintenance and management to be made through a process of the SVP.

<Configuration of Storage System>

Figure 2:
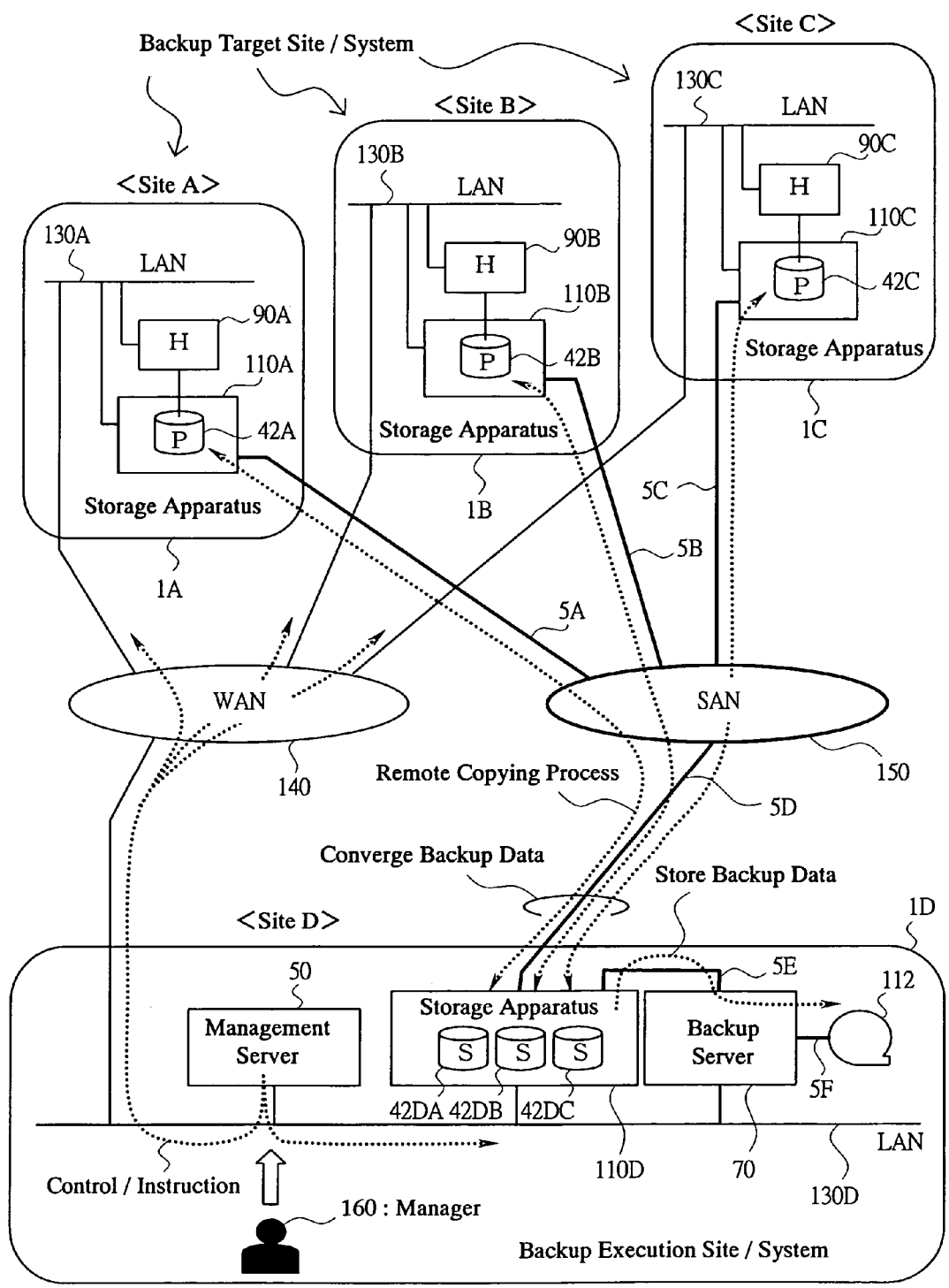
FIG. 2 is a block diagram showing an entire configuration of the storage system that is one embodiment of the present invention.

FIG. 2 shows an example of an entire system configuration of the storage system according to the present embodiment.

The overall picture of the configuration of this storage system is such that an information processing system 1D on a site D, which serves as a backup execution site (first site), is communicably connected to information processing systems 1 {1A, 1B, and 1C} on respective sites A, B, and C, which serve as backup target sites (second sites), through a WAN 140 and a SAN 150. This example shows a case where there are three sites as backup target sites, namely, site A, site B, and site C at remote locations and there is one site D as a backup execution site. Hereinafter, the information processing systems 1 {1A to 1D} on the respective sites A to D may be simply referred to as "systems". In addition, if no distinction is made among storage apparatuses 110A to 110D on the respective sites, they are also referred to as "storage apparatuses 10".

The "backup target site" indicates a site that has, in the information processing system, the storage apparatus storing data to be a backup target in the storage volume etc. The "backup execution site" indicates a site having the information processing system on such a side that the backup process characterized by the present invention is controlled and the backup data is converged and stored. The backup process itself is executed across both of the first and second sites.

Respective sites A, B, and C have systems 1A, 1B, and IC. The systems 1 {1A, 1B, 1C} are configured so that a business server 90 {90A, 90B, 90C} (denoted by "H") and a storage apparatus 110 {110A, 110B, 110C} are connected to a LAN 130 {130A, 130B, 130C}. The business server 90 is a host device with respect to the storage apparatus 110. In each of the systems 1, a system operation is implemented depending on the form of each operation of the business server 90 and the storage apparatus 110, for example. In the configuration in which the business server 90 and the storage apparatus 110 are connected by a communication link, each of the business server 90A to 90C executes an online business while having accesses to the storage apparatus 110A to 110C for a data input/output through the communication link and storing data in each storage volume (denoted by "P") in the storage apparatus 110A to 110C.

The site D has the system 1D. The system 1D is configured so that the storage apparatus 110D, the backup server 70, the backup device 112, the management server 50, etc., which are related to the backup process, are connected to the LAN 130D. Respective units in the system 1D are capable of communication of a control system on the LAN 130D.

Each of the LANs 130D to 140D is connected as a wide area communication network to a WAN 140, whereby communication between the sites can be established by using the network. Through the WAN 140, the LAN 130D on the first site and the LANs 130A to 130C on the respective second sites are communicably connected, whereby the communication of the control system is established as occasion demands.

In the system 1D, the storage apparatus 110D has a remote copying function and serves as a convergent destination of backup data in a first process of the backup process. The storage apparatus 110D executes the first process in accordance with control by the backup server 70.

In addition, the backup server 70 executes control of the backup process in accordance with control by the management server 50. In the first process of the backup process, the backup server 70 controls copying of data to converge the backup data between the storage apparatuses 10 on the first and second sites in accordance with an instruction from the management server 50. In the second process of the backup process, the backup server also executes a process for actually storing the backup data converged in the storage apparatus 110D into a memory area of a recoding medium in the backup device 112.

In addition, in the second process, the backup device 112 stores the backup data in the memory area of the recording medium in accordance with the control of the backup server 70. The management server 50 gives an instruction to, executes control over, and sets the entire backup process.

In the system 1D on the site D, the manager 160 is a person responsible for backup operation/management of this storage system as a whole. The manager 160 gives an instruction to or/and makes settings for the management server 50. The manager 160 performs work related to the backup process by, for example, using an operational client device (not shown) communicably connected to the LAN 130D or/and directly manipulating the management server 50. The operational client device is an information processor such as a PC, and provided with a function of communicating with the management server 50, a user interface for operations involved in the backup process, and the like. The instruction of the backup process or/and information of setting it is received and transmitted between the operational client device etc. and the management server 50.

After the manager 160 first performs, to the management server 50, the work of establishment or/and setting of a hardware environment related to the backup process, the control of the management server 50 based on the setting allows the backup process to be executed automatically. If the manager 160 wishes to be aware of the backup condition, the manager makes an access to the management server 50 from the operational client device etc. and obtains and displays information on the backup condition, and checks it. If the manager also wishes to change the settings of the backup process, the manager executes the same operation.

In addition, the storage apparatus 110D on the site D and the storage apparatuses 110A to 110C on the respective sites A to C are connected through a communication network such as the SAN 150. The respective storage apparatuses 110A to 110D are provided with a communication interface processing unit that executes a communication process in accordance with a Fiber Channel (FC) protocol etc. on the SAN 150. A CHA 36 as described later executes this communication process. The storage apparatuses 110A to 110D are connected to the SAN 150 by communication links 5A, 5B, 5C, and 5D for a process for transferring the backup data. The system is configured so that, among the storage apparatuses 10, the data stored in the storage volumes of the respective storage apparatuses 10 can be copied by the SAN 150, the communication links 5A to 5D, and a data copying means. The data stored in a storage volume ("P") of each of the storage apparatuses 110A to 110C on the sites A to C is copied by the data copying means, and the backup data is transferred to a storage volume (denoted by "S") of the storage apparatus 110D on the site D.

In the present embodiment, the respective storage apparatuses 10 have the remote copying functions as the data copying means. The remote copying function is used in the first process of the entire backup process. The remote copying function is a conventional technique that implements copying of data through control of a copy pair among the storage volumes. In the first process of the backup process, the remote copying function is used to execute the remote copying process through the respective communication links 5A to 5C and the communication link 5D. Thereby, the backup data from the respective storage apparatuses 110A to 110C is converged to the storage apparatus 110D. The backup data may be transferred between the sites by using some data copying means that is not limited to the remote copying function.

In addition, in the present embodiment, the storage apparatus 110D and the backup server 70 are in particular connected through the communication link 5E for transferring the backup data, and the backup server 70 and the backup device 112 are connected through the communication link 5F for transferring the backup data. In the second process of the backup process, by a process of the backup server 70, each piece of backup data is transferred to and stored in the backup device 112 through the communication links 5E and 5F.

Note that, although components in the system 1 are shown so as to be accommodated within each site, an element such as the business server 90 except the storage apparatuses 10 may be located outside the site if communication with the above element is possible.

The management server 50 plays a role of executing integrated control of the entire backup process characterized by the present invention, and provides the control or/and instruction related to the backup process to the units in the systems 1A to 1C on the respective sites A to C through the LANs 130A to 130D and the WAN 140. In the first process, the management server 50 sends the instruction of the backup process to each of the units (mainly, the business servers 90A, 90B, etc.) in the systems 1A to 1C on the remotely located respective sites A to C through the WAN 140 or to the unit (mainly, the backup server 70) in the system 1D on the site D through the LAN 130D. At this time, the management server 50 executes the instructions given to the respective sites with the synchronized timing. Due to the synchronization, the manager 160 responsible for backup operation/management synchronizes and converges backup of the data stored in the storage apparatuses 110A to 110C on the respective sites A to C, into the system 1D on one site D, without being aware of the operation for each of the plurality of sites A to C that are spotted in remote locations.

In accordance with the instruction from the management server 50, the backup server 70 controls data copying to converge the backup data between the storage apparatuses 10 on the first and second sites. In addition, the backup server 70 controls the process for actually storing, into the backup storage 112, each piece of backup data that has been fetched into the storage apparatus 110D on the site D from the storage apparatuses 110A to 110C on the respective sites A to C by copying the data.

In accordance with the control of the backup server 70, the storage apparatus 110D to be used in the backup process executes the remote copy process by the remote copying function, thereby obtaining the backup data to be transferred by the remote copying process from the storage volumes (P) of the storage apparatuses 110A to 110C on the respective sites A to C to the storage volumes (S).

Note that although the configuration in which as a communication means among the sites, different networks are used for the control information system and the data system has been described, the present embodiment is not be limited to this case and may adopt a configuration in which the control information and the data associated with the backup process can be received and transmitted on the same network.

Further, an example of a conventional backup system will be briefly described for comparison. For example, an information processing system built on a certain site has a storage apparatus and a business server. With respect to this information processing system, an example of the backup system has such a configuration that a backup server is connected to the storage apparatus and the backup device is connected to the backup server. The data stored in the storage volume of the storage apparatus is stored in a memory area of the backup device through the backup process of the backup server. In addition, another configuration of the back up system is such that: a program for implementing a function that corresponds to the backup process control function the above-mentioned backup server has is installed in the host device; and the backup device is connected. In this configuration, the data stored in the storage apparatus is backed up into the backup device through the control of the backup process of the host device. In addition, in the information processing systems on the plurality of sites, the above-mentioned backup systems are constructed and the backup operation/management is executed separately on each site, or a plurality of tasks associated with the backup operation/management are executed by the manager.

<Configuration of Storage Apparatus>

Figure 3:
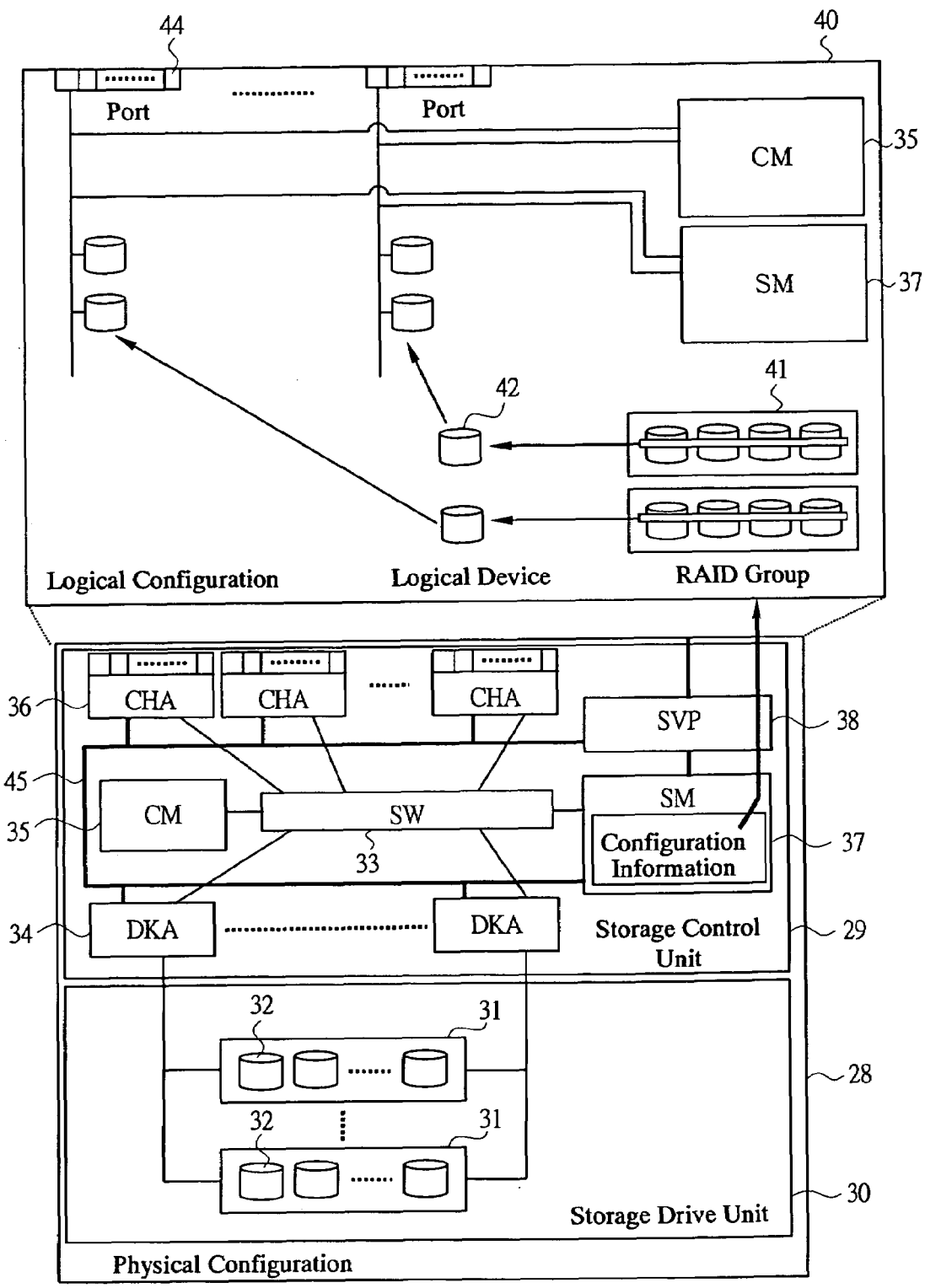
FIG. 3 is an explanatory view showing a basic configuration of the storage apparatus in the storage system that is one embodiment of the present invention.

FIG. 3 is a block diagram schematically showing a basic configuration of the storage apparatus 10. A physical configuration 28 and a logical configuration 40 are included as a configuration of the storage apparatus. The physical configuration 28 is associated with a hardware configuration of the storage apparatus 10. A storage control unit 29 is associated with the basic chassis 11 and the controller. A storage drive unit 30 is associated with the additional chassis 12 and the memory unit.

The storage control unit 29 has CHAs (channel adapters) 36, DKAs (disk adapters) 34, a CM (cache memory) 35, a SM (shared memory) 37, and a SW (switch unit) 33, each of which is connected through the SW 33 and a bus. The SVP (service processor) 38 is also connected to the storage control unit 29 by an internal network 45.

Each CHA 36 is designed to control a data transfer from/to the host device represented by a server, a PC, a work station, and a mainframe computer, etc., and has a plurality of communication ports. A plurality of CHAs 36, e.g., thirty-two CHAs 36 can be provided in the physical configuration 28. Each CHA 36 is prepared depending on a type of communication interface with the host device to be connected, such as an open-system CHA and a mainframe-system CHA. Each CHA 36 receives a command to request for data write/read or receives data from the host device to which each CHA is connected, and runs based on the received command.

The respective DKAs 34 control the data communication between the disk drives 32 and the DKAs. In the physical configuration 28, a plurality of DKAs, e.g., four or eight DKAs can be provided. Each DKA 34 and each disk drive 32 are connected through a communication network such as a SAN, etc., and execute the data transfer in units of block in accordance with a FC protocol. Each DKA 34 monitors a status of the disk drive 32, and the monitored results are transmitted to the SVP 38 through the internal network 45.

As flow of the data process, when receiving a read command through the communication port from the host device to be connected to the CHA for communication, the CHA 36 stores the read command in the SM 37. The DKA 34 refers to the SM 37 as needed, so if the DKA finds an unprocessed read command, it reads out data from the disk drive 32 and stores the read-out data in the CM 35. The CHA 36 reads out the data transferred to the CM 35 and transmits it to the host device through the communication port. In addition, when receiving a write command from the host device, the CHA 36 stores the write command in the SM 37. The CHA 36 stores the data (user data) received from the host device in the CM 35. After storing the data in the CM 35, the CHA 21 notifies the host device that a writing process has been completed. The DKA 34 reads out the data stored in the CM 35 in accordance with the write command stored in the SM 37, and stores the read-out data in a predetermined disk drive 32.

Each CHA 36 and each DKA 34 are configured so as to include a printed circuit board on which a processor and a memory, etc. are mounted and a control program stored in the memory, and implement respective predetermined functions by cooperating with these hardware and software.

The CM 35 is composed of, for example, a nonvolatile memory, wherein, for example, user data etc. are stored therein. The SM 37 or control memory is composed of, for example, a nonvolatile memory, wherein, for example, control information or management information, etc. is stored therein. The information such as the control information can be multiply managed by the plurality of SMs 37. The plurality of SMs 37 and the plurality of CMs 35 can be provided, respectively. In addition, the CM 35 and the SM 37 can be mixedly mounted on the same memory board. Otherwise, it is possible to use a portion of the memory as a cache area and use another portion thereof as a control area.

The SW 33 is connected to the respective CHAs 36, the respective DKAs 34, the CM 35, and the SM 37. Thereby, all of the CHAs 36 and the DKAs 34 can be accessed to the CM 35 and the SM 37, respectively. For example, the SW 33 can be configured as an ultra high-speed cross bar switch etc.

A number of disk drives 32 can be mounted on the storage apparatus 30. The plurality of disk drives 32 are accommodated in a disk-drive incorporating box 31. The respective disk drives 32 are independent physical memory units and may be implemented, for example, as HDDs or semiconductor memory units, etc.

The SVP 38 is connected to the CHAs 36, the DKAs 34, and the SM 37, etc. through the internal network 45. The SVP 38 collects various types of information on the storage apparatus 10. The SVP 38 can refer to the information stored in the SM 37. By connecting the SVP 38 to an external communication network such as the LAN 130, the storage apparatus 10 can be managed from an external management terminal through the above-mentioned communication network and the SVP 38. The above-mentioned management terminal is a device etc. in which management software implementing the process for managing the storage apparatus 10 is installed in the host device. The various types of information managed by the SM 37 include configuration information that is required in using actually the storage apparatus 10 from the viewpoint of a side of the host device, and are retained as setting management information of the storage apparatus 10. The configuration information contains information on the physical configuration 28 and the logical configuration 40.

The logical configuration 40 has, for example, a RAID group 41, logical devices 42, ports 44, logical CM 35 and SM 37, etc. The RAID group 41 is associated with a RAID configuration for using the plurality of disk drives 32 as virtual/logical memory areas. The logical device 42 is a virtual memory area set so as to be actually accessible to the host device from the memory area in the RAID group 41. The logical device 42 is assigned as the storage volume in which data from the host device is stored. The port 44 sets an access path with respect to the logical device 42 serving as a target for using the storage apparatus 10 by the host device etc. Although the ports 44 are considered the same as the CHAs 36 in terms of real physical locations, the logical configuration information is represented as ports. The logical CM 35 and SM 37 are associated with the physical CM 35 and SM 37.

In the logical configuration 40, the RAID group 41 can be configured on the physical memory area provided by the plurality of disk drives 32. For example, a set of four disk drives 32 configure the RAID group 41 although depending on the RAID configuration. One or more logical device 42 can be set on the RAID group 41. Note that memory resources used by the physical configuration 28 are not necessarily provided within the same storage apparatus 10 and can incorporate and use external resources located outside the physical configuration 28 as if the external resources are their own memory resources.

<Management Server>

Figure 4:
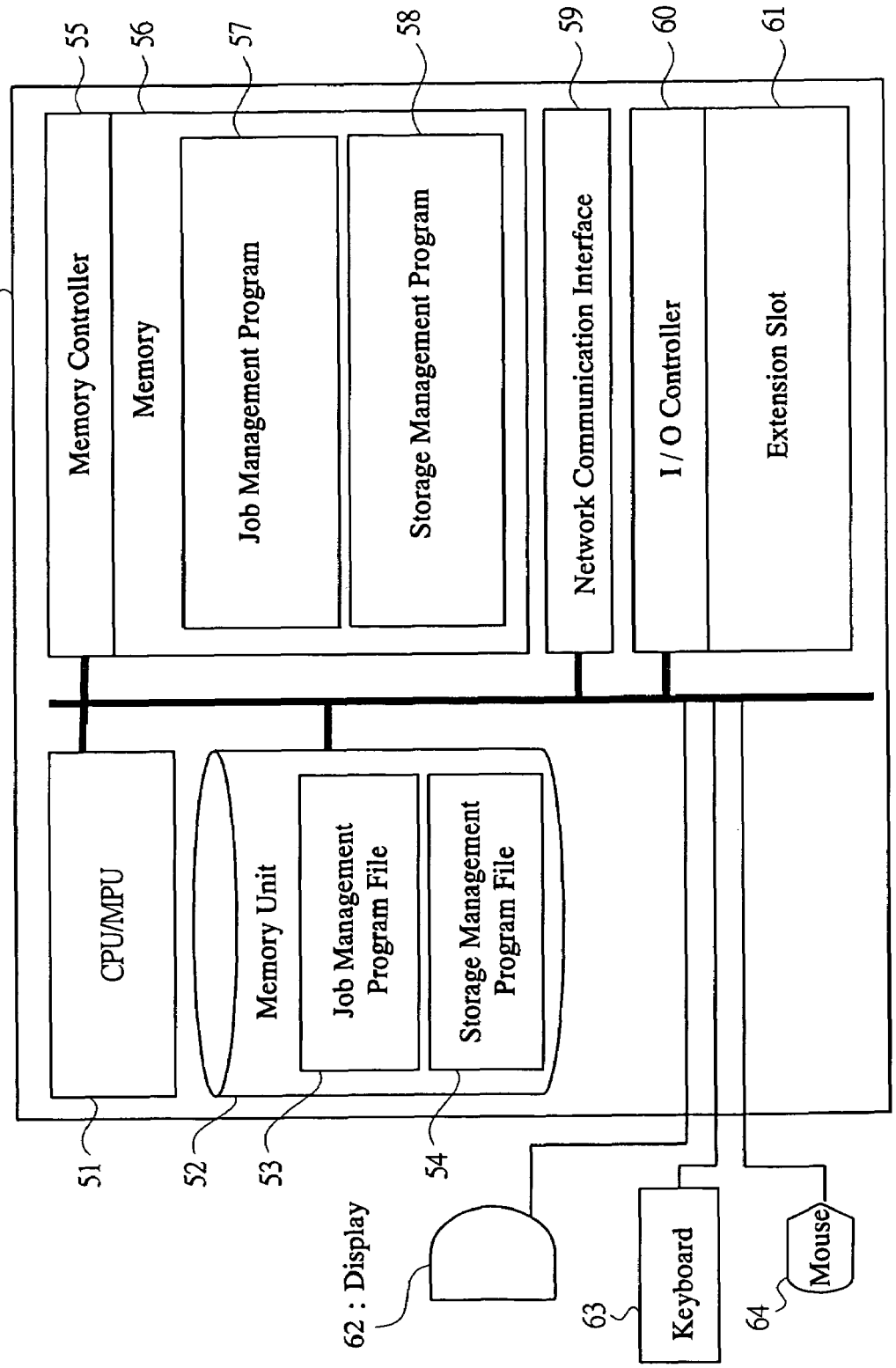
FIG. 4 is a block diagram showing a configuration of a management server in the storage system that is one embodiment of the present invention.

FIG. 4 is a block diagram showing a configuration of a management server 50. Although described as a server device in this embodiment, the management server 50 may be a host device represented by a server, a PC, a workstation, and a mainframe computer, etc.

The management server 50 is composed of, for example, a CPU/MPU 51, a memory unit 52 such as a HDD, a memory controller 55, a memory 56, a network communication interface 59, an I/O controller 60 of an extension bus, an extension slot 61, a display 62, a keyboard 63, and a mouse 64, etc.

The memory unit 52 may be an HDD etc. in which a job management program file 53 and a storage management program file 54 are stored. By executing the job management program file 53, a job management program file 57 is loaded onto the memory 56. By executing the storage management program file 54, a storage management program file 58 is loaded onto the memory 56. The CPU/MPU 51 that is a processor executes a control program containing the job management program 57 and the storage management program 58 on the memory 56 and implements a function as the management server 50. A network communication interface 59 is connected to the LAN 130D. The manager etc. can execute operations related to the backup process through the display 62, the keyboard 63, and the mouse 64, etc.

<Backup Server>

Figure 5:
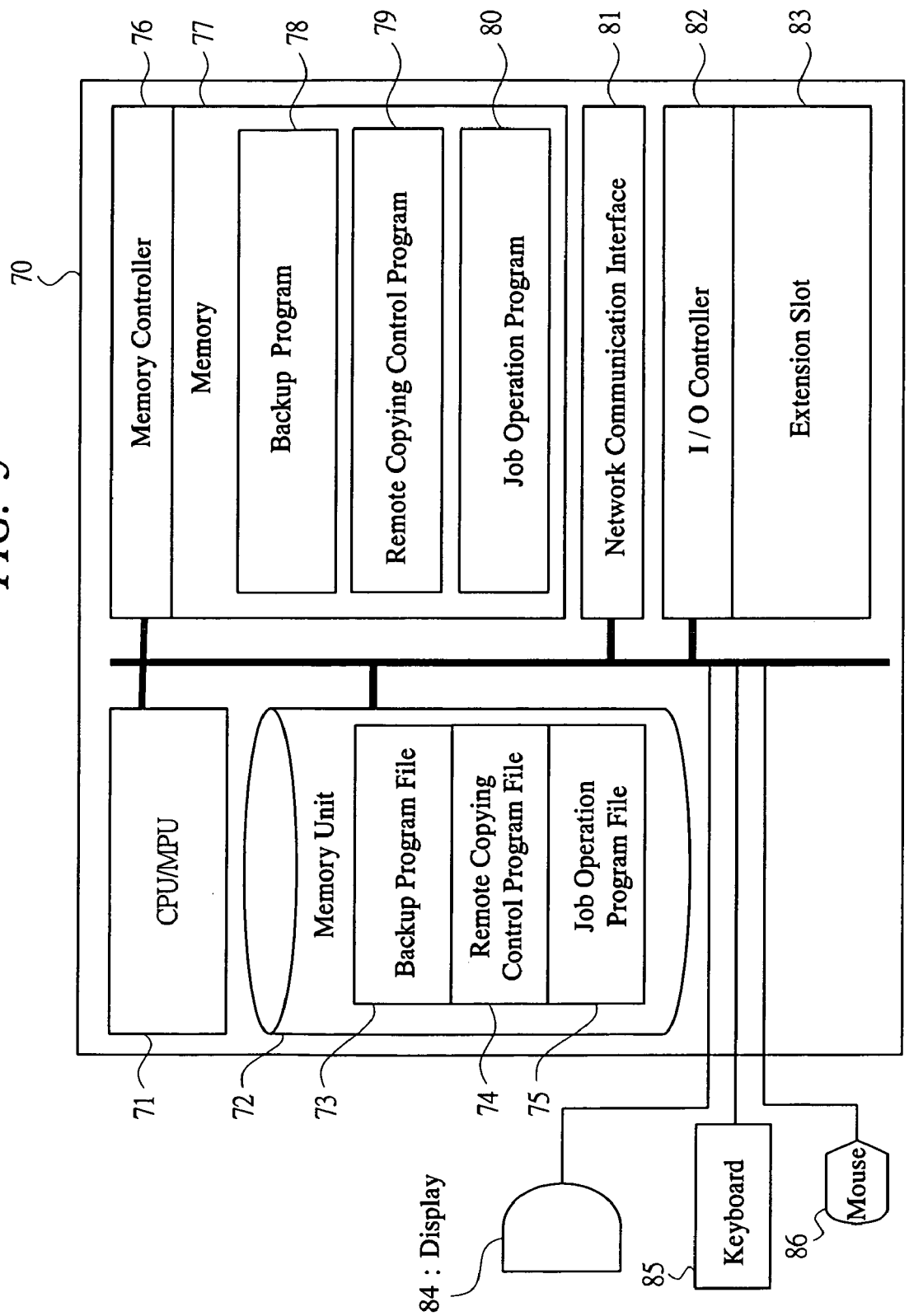
FIG. 5 is a block diagram showing a configuration of a backup server in the storage system that is one embodiment of the present invention.

FIG. 5 is a block diagram showing a configuration of a backup server 70. Although described as a server device in this embodiment, the backup server 70 may be a host device represented by, for example, a server, a PC, a workstation, and a mainframe computer, etc.

The backup server 70 is composed of, for example, a CPU/MPU 71, a memory unit 72, a memory controller 76, a memory 77, a network communication interface 81, an I/O controller 82 of an extension bus, an extension slot 83, a display 84, a keyboard 85, and a mouse 86, etc.

The memory unit 72 may be an HDD etc. in which a backup program file 73, a remote copy control program file 74, and a job operation program file 75 are stored. By executing the respective program files (73 to 75), a backup program 78, a remote copying control program 79, and a job operation program 80 are loaded onto the memory 77, respectively. The CPU/MPU 71 that is a processor executes a control program containing the backup program 78, the remote copying control program 79, and the job operation program 80 onto the memory 77, thereby implementing a function as the backup server 70. The network communication interface 81 is connected to the LAN 130D. The manager etc. can execute operations such as settings related to the backup process through the display 84, the keyboard 85, and the mouse 86, etc.

<Business Server>

Figure 6:
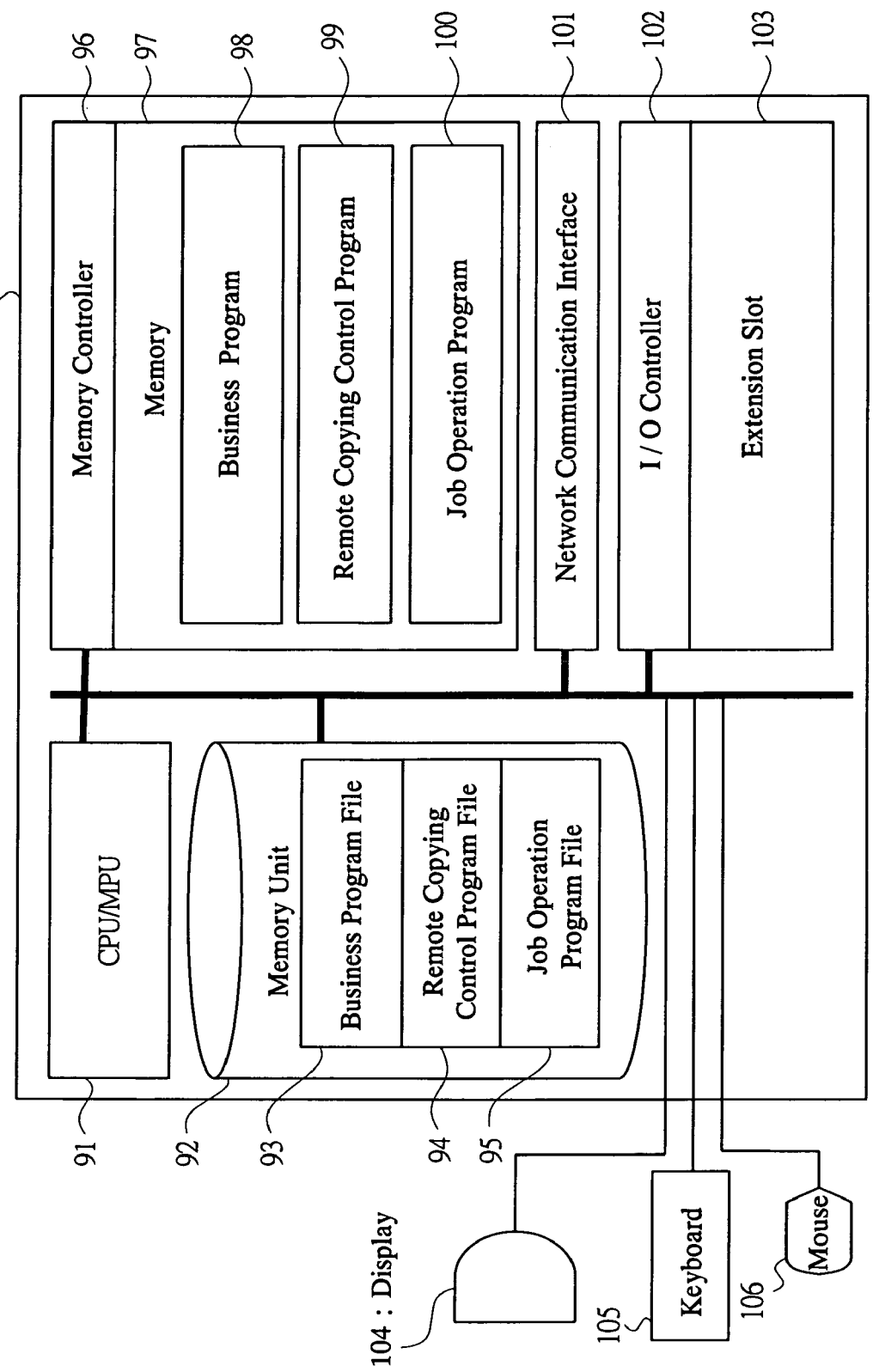
FIG. 6 is a block diagram showing a configuration of a business server in the storage system that is one embodiment of the present invention.

FIG. 6 is a block diagram showing a configuration of a business server 90 {90A, 90B, 90C}. Although described as a server device in this embodiment, the business server 90 may be a host device represented by, for example, a server, a PC, a workstation, and a mainframe computer, etc.

The business server 90 is composed of, for example, a CPU/MPU 91, a memory unit 92, a memory controller 96, a memory 97, a network communication interface 101, an I/O controller of an extension bus, an extension slot 103, a display 104, a keyboard 105, and a mouse 106, etc.

The memory unit 92 may be a HDD etc. in which a business program file 93, a remote copying control program file 94, and a job operation program file 95 are stored. By executing the respective program files (93 to 95), a business program 98, a remote copy control program 99, and a job operation program 100 are loaded onto the memory 97, respectively. The network communication interface 101 is connected to the LAN 130 or/and the storage apparatus 110. The user etc. can execute operations related to the business processes through the display 104, the keyboard 105, and the mouse 106, etc.

<Configuration for Backup Process>

Figure 7:
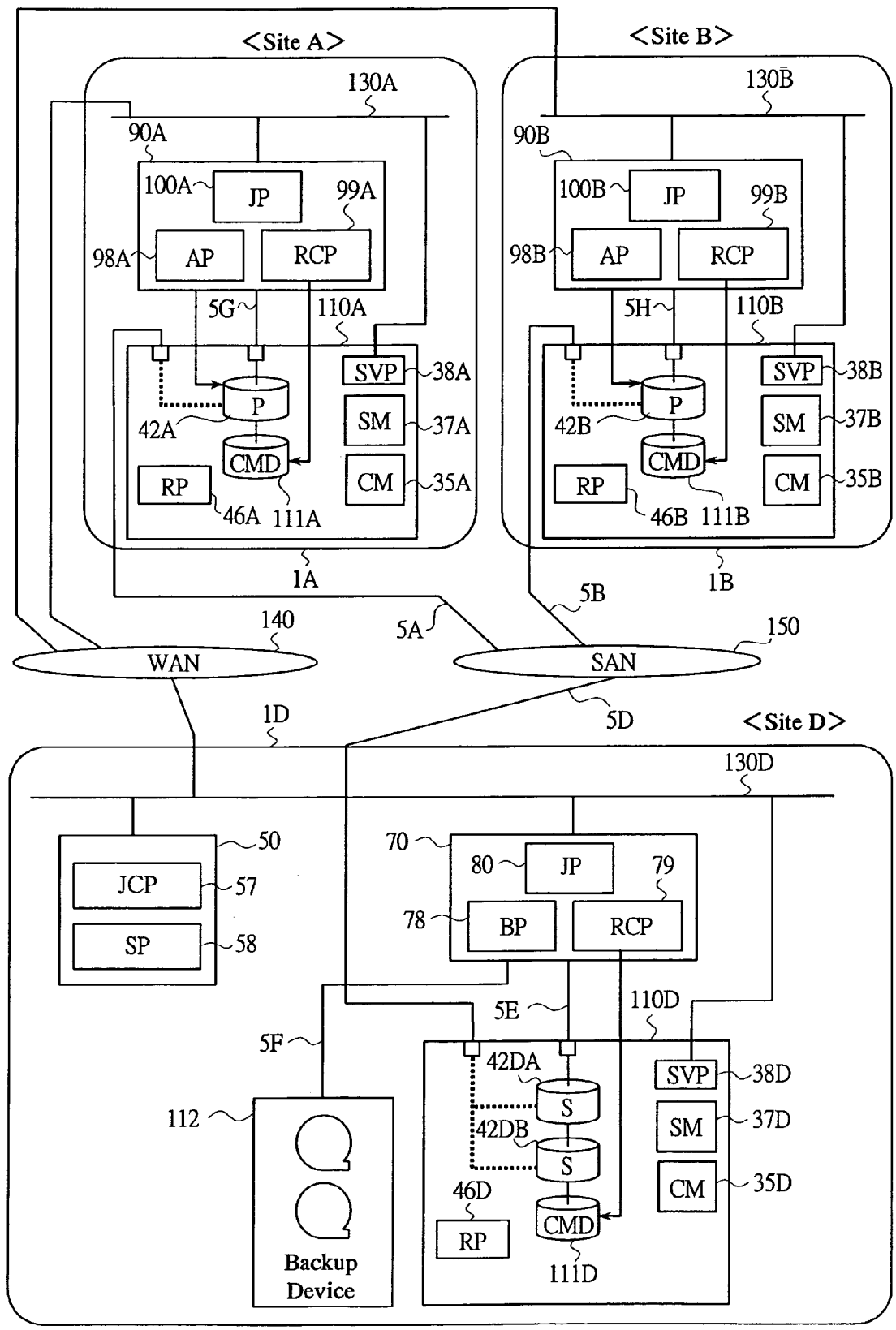
FIG. 7 is a view showing a configuration related to a backup process in the storage system that is one embodiment of the present invention.

FIG. 7 is a block diagram showing a configuration for backup process in this storage system. In addition, FIG. 8 corresponds to FIG. 7 and is a sequence diagram showing flow of the entire backup process of this storage system. Herein, an example in which the storage system is composed of two sites (sites A and B) to be a backup target and one site (site D) to be a backup execution site is illustrated.

In FIG. 7, the management server 50, the backup server 70, and the storage apparatus 110D in the system 1D on the site D are communicably connected to business servers 90A and 90B and the storage apparatuses 110A and 110B through the LANs 130A and 130B in the respective systems 1A and 1B. In addition, the respective storage apparatuses 110D, 110A, and 110B are connected to the LANs 130D, 130A, and 130B through the SVPs 38D, 38A, and 38B, thereby being able to communicate with the outside. In addition, the storage apparatus 110D can be interconnected to the storage apparatuses 110A and 110B through the port, the communication links 5D, 5A, and 5B and the SAN 150.

In the system 1D on the site D, the management server 50 has a job management program (denoted by "JCP") 57 and a storage management program ("SP") 58. The backup server 70 has a job operation program ("JP") 80, a backup program ("BP") 78, and a remote copying control program ("RCP") 79. The storage apparatus 110D has a remote copying program ("RP") 46D in the controller, and has logical devices ("S") 42DA and 42DB and a command device ("CMD") 111D to be copy destinations. The respective logical devices 42DA and 42DB in the storage apparatus 110D are connected to the SAN 150 through the port and the communication link 5D. In addition, the respective logical devices 42DA and 42DB and the CMD device 111D can be accessed from the backup server 70 through the port and the communication link 5E. The backup server 70 can transfer data of the logical devices 42DA and 42DB to the backup device 112 through the communication link 5F and thus store it in the memory area of the recording medium.

In the systems 1A and 1B on the sites A and B, the business servers 90A and 90B have job operation programs ("JP") 100A and 100B, business programs ("AP") 98A and 98B, and remote copying control programs ("RCP") 98A and 98B, respectively. The storage apparatuses 110A and 110B have remote copying programs ("RP") 46A and 46B in the controllers and have logical devices ("S") 42A and 42B and command devices 111A and 111B to be copy destinations, respectively. The logical devices 42A and 42B in the storage apparatuses 110A and 110B are connected to the SAN 150 through the port and the communication links 5A and 5B, respectively. In addition, the logical device 42A and the CMD device 111A can be accessed from the business server 90A through the port and the communication link 5G. The logical device 42B and the CMD device 111B can be accessed from the business server 90B through the port and the communication link 5H.

The respective programs will be described. In the storage system, the job management program 57 and the job operation programs 100A, 100B, and 80 contained in the respective systems 1 are programs for executing the processes for controlling the backup process, which are characterized by the present invention.

In the system 1D on the site D, the job management program 57 in the management server 50 is a program for executing an integrated control operation of the entire backup process in the above-mentioned storage system. The job management program 57 gives instructions to or controls the operations of the job operation programs 10A, 100B, and 80 of the storage apparatuses 110D, 110A, and 110B in the respective sites D, A, and B. By the above-mentioned control operation, the backup process is controlled while the conditions of the storage apparatuses 10 on the respective sites D, A, and B are grasped.

The job operation programs 100A and 110B in the business servers 90A and 90B and the job operation program 80 in the backup server 70 are programs for executing processes in accordance with instructions or control of the job management program 57 of the management server 50, respectively. The job operation programs 110A and 100B in the business servers 90A and 90B give instructions related to the backup process, to the operations of the business programs 98A and 98B and that of the remote copying control programs 99A and 99B, respectively. The job operation program 80 in the backup server 70 gives instructions related to the backup process, to the operation of the backup program 78 and that of the remote copying control program 79.

The storage management program 58 in the management server 70 is a program for executing the process for grasping the conditions of the respective storage apparatuses 10. The conditions of the respective storage apparatuses 10 include a condition of an online business process with the business server 90, and a condition of preparation for and/or progress of the backup process. By executing the storage management program 58, various types of information for grasping the conditions are obtained from the SVP 38 {38A, 38B, and 38D} in the respective storage apparatuses 10 through the LAN 130 etc. The respective SVPs 38 collect and grasp, as information, the conditions of their own storage apparatuses 10 as needed, and provide the grasped information in accordance with a request from the external management server 50 etc. by executing the storage management program 58 in the management server 50, the operating conditions of the respective storage apparatuses 110A, 110B, and 110D are controlled through the SVPs 38A, 38B, and 38D. For such control, it is possible to proceed with the above-mentioned process while the operating conditions of the respective storage apparatuses 10 are grasped at a time of the backup process.

In the control process by the job management program 57 and the job operation programs 80, 100A, and 110B, in order to grasp the conditions by the storage management program 58, for example, a status of a data-input/output access from the business server 90A etc. is grasped with respect to the storage apparatus 110A in the system 1A, and control etc. is executed so that a data input/output access for the backup operation is temporarily stopped. In addition, to grasp the above-mentioned conditions, each condition of the remote copying processes among the respective storage apparatuses 10 on the respective sites is grasped, and the backup data is converged from the respective sites A and B to the system 1D on the site D and the conditions of the converged backup data are grasped.

The backup program 78 in the backup server 70 executes a process for controlling storage of the backup data from the storage apparatus 110D to the backup device 112. The backup program 78 is processed in accordance with an instruction given in executing the job operation program 80.

The remote copying control program 79 in the backup server 70 is a program for executing the process for controlling the remote copying process in the storage apparatus 110D. In the remote copying control process by the remote copying control program 79, a process command is issued to the CMD device 111D reserved in the storage apparatus 110D, for example. In accordance with an input of a command to the CMD 111D, the remote copying process by the remote copying program 46D of the storage apparatus 110D is done.

The remote copying program 46D in the storage apparatus 110D is a program for executing a remote copying process in the storage apparatus 110D in accordance with the instruction given in executing the remote copying control program 79.

In the systems 1A and 1B on the sites A and B, the business programs 98A and 98B in the business servers 90A and 90B are programs for executing the online business processes to the storage apparatuses 110A and 110B, respectively. By executing the business programs 98A and 98B, data is inputted to and/or outputted from the storage volumes such as the logical devices ("P") 42A and 42B in the storage apparatuses 110A and 110B, respectively.

The remote copying control programs 99A and 99B in the business servers 90A and 90B are programs for executing the process for controlling the remote copying processes in the storage apparatuses 110A and 110B. In the remote copying control processes by the remote copying control programs 99A and 99B, each process command is issued to the CMD devices 111A and 111B reserved in the storage apparatuses 110A and 110B, respectively. In accordance with an input of the command to the CMD 111D, the remote copying processes are executed by the remote copying programs 46A and 46B in the storage apparatuses 110A and 110B.

The remote copying programs provided in the controllers of the storage apparatuses 110A and 110B is programs for executing the remote copying processes in the storage apparatuses 110A and 110B in accordance with the instructions from the remote copying control programs 99A and 99B provided in the business servers 90A and 90B.

In the remote copying process, between the storage apparatuses 110A and 110B and the storage apparatus 110D, copy of data stored in the logical devices ("P") 42A and 42B, each of which is one copy source in a copy pair, is transferred, as backup data, to the logical devices ("S") 42DA and 42DB, each of which is the other copy destination therein, through the communication links 5A and 5B, the SAN 150, and the communication link 5D, etc.

In the present embodiment, the remote copying function provided in each storage apparatus 10 is used as a data copying means of the backup operation. A portion related to the remote copying function includes the remote copying programs 46A, 46B, and 46D provided in the respective storage apparatuses 10, the CMD devices 111A, 111B, and 111D reserved for control of the remote copying, the remote copying control programs 99A and 99B provided in respective business servers 90, and the remote copying control program 79 provided in the backup server 70. In addition, the communication link for transferring the remote copy data (i.e., backup data) reserved for the remote copying process on the SAN 150 etc., or/and the communication link for controlling the remote copying between the storage apparatus 10 and the business server 90 etc. in the each of the systems 1 is used.

By using the remote copying function based on the control from the management server 70 to the units in the respective systems 1, the backup data is transferred between the storage apparatuses 10 without interposing any process in the host device. By using the remote copying function, the backup process can be executed in parallel while the business server 90 serving as the host device executes a routine process such as the online business process. Note that the data copying means is not limited to the remote copying function and may adopt a configuration in which the data is copied through the processes of the host device. In this case, during the backup process, the business server 90 serving as the host device executes not the routine process but the data copying process.

Before describing the overall picture of the backup operation, outline of the conventional remote copying function used in the backup operation will be described. In the remote copying operation by the remote copying function, when data is copied between the first and second storage apparatuses 10 in this embodiment, a process unit to be a copied target is set as the logical device 42. A copy pair means a combination of a copy-source logical device ("P") 42 and a copy-destination logical device ("S") 42. The copy pair is controlled, through the remote copying process by the storage apparatus 10 and through the remote copying control over the storage apparatus 10 by other devices. By the control of the copy pair, the backup data is transferred between the copy pair, namely, from the second storage apparatuses 110A and 110B to the first storage apparatus 110D. In this embodiment, the copy pair is establishing so that the logical devices 42A and 42B for executing backup to the respective storage apparatuses 110A and 110B on the sites A and B are set as the copy-source logical devices ("P") and the logical devices 42DA and 42DB for converging each piece of backup data in the storage apparatus 110D on the site D is set as the copy-destination logical device ("S").

As transition states of the copy pair, the expression "pair cancelled state" refers to a state in which a relation of the copy pair is cancelled and data of the copy-source logical device is not reflected in the copy-destination logical device at all. The expression "pair generated" refers to a state in which the copy pair is established from the pair cancelled state and initial data is fully copied from the copy-source logical device to the copy-destination logical device. The expression "pair synchronized state" refers to a state in which the full initial data copying is completed and data updated at the copy-source logical device is synchronously reflected in the copy-destination logical device. The expression "pair split" refers to a temporarily canceling synchronized condition while maintaining the relation of the copy pair from the pair synchronized state. The expression "pair split state" refers to a state of the copy pair in which only a temporary synchronized state is cancelled due to the pair split. Although the updated date at the copy-source logical device is not reflected at the copy-destination logical device in the pair split state, a difference between the data of the copy-source logical device and that of the copy-destination logical device resulting from updating the copy-source logical device is differentially managed. The expression "pair resynchronization" refers to recovering from the pair split state to the pair synchronized state. When resynchronization from the pair split state to the pair synchronized state takes place, the full data copying of the logical device is not executed but the differential data resulting from updating of the copy-source logical device is copied so as to return to the synchronized state. The expression "pair cancellation" refers to completely canceling the relation of the copy pair. The remote copying function can handle the plurality of logical devices.

<Backup Operation>

Figure 8:
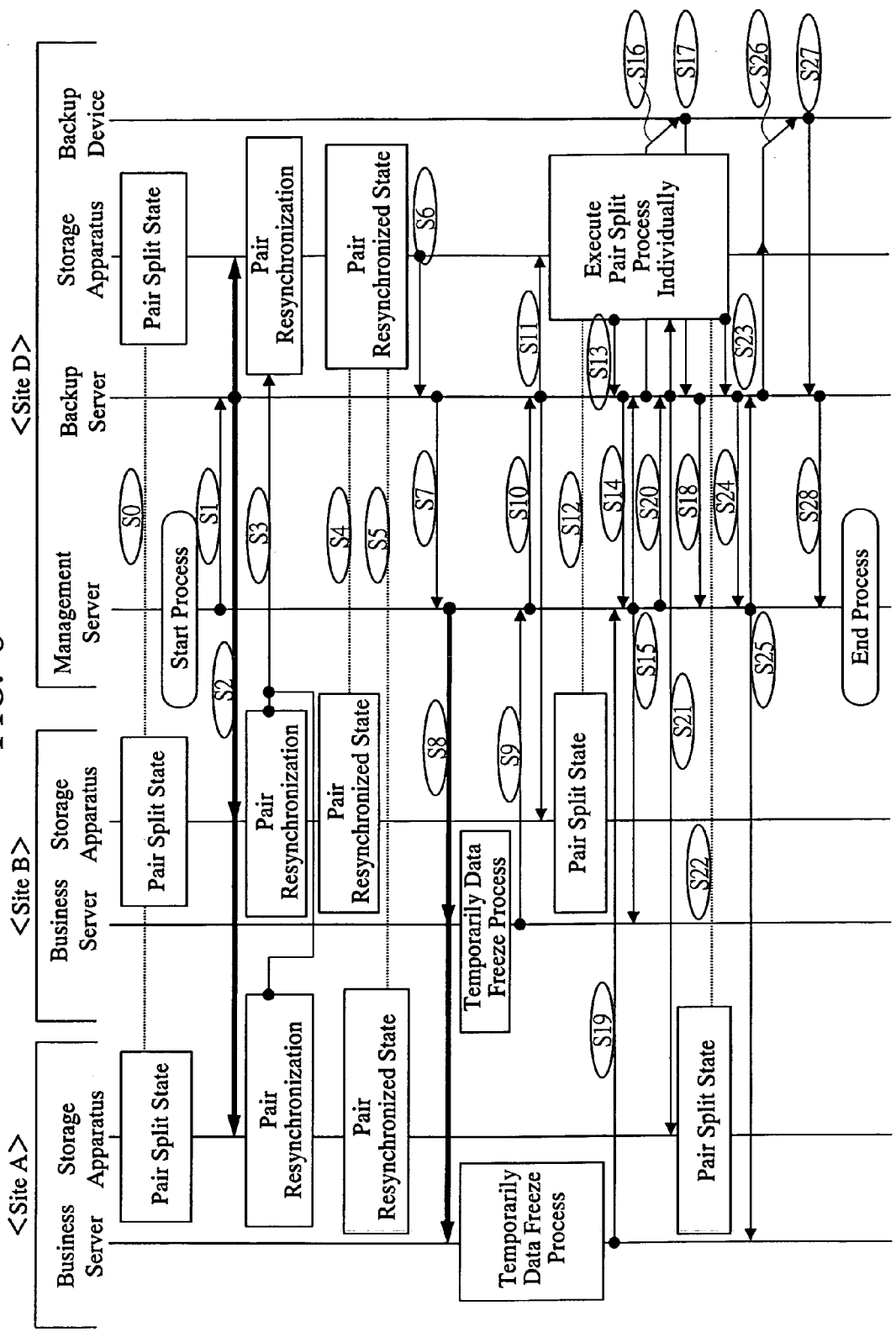
FIG. 8 is a view of sequences showing a flow of the backup process in the storage system that is one embodiment of the present invention.

With reference to FIG. 8, the overall process flow of the backup operation will be described. First, in step S0, between the storage apparatuses 110A and 110B of the sites A and B that are the backup target sites and the storage apparatus 110D of the site D that is the backup execution site, the logical devices 42 in the storage apparatuses 110A, and 110B are set as copy-source logical devices ("P"), and the logical device 42 in the storage apparatus 110D is set as a copy-destination logical device ("S"). Then, after the copy pair has been established through the operation of pair generation, the data is made to be the pair synchronized state and thereafter the pair split is once executed to be in the pair split state.

In the copy pair control, the respective copying control programs 99A, 99B, and 79, etc. issue process commands to the CMD device 111A, 111B, and 111D, etc. in the storage apparatuses 10. Then, the command received by the CMD device is handed to the controller of the storage apparatus 10, and the remote copy programs 46A, 46B, and 46D execute the actual remote copying processes. In this embodiment, the process command is received by the dedicated CMD device 111A etc. to execute the remote copying control. However, this embodiment is not limited to this case and may adopt a configuration in which a memory such as the SM 37 that can hand the command to the controller of the storage apparatus 10 or any other means are used.

At a backup execution point, the backup process is started from the pair split state. When the backup process is started, first at S1, an instruction to execute a pair resynchronization process is given to the backup server 70 from the management server 50 of the system 1D. In the copy pair control, it is preferable that the CMD device 111 in one of the storage apparatuses 10, which stores the storage volume constituting the copy pair, is used, and therefore it is assumed in this embodiment that the copy pair is controlled on a side of the backup execution site, namely, the system 1D. The job management program 57 of the management server 50 outputs an instruction for the backup process to the job operation program 80 of the backup server 70.

In S2, the job management program 80 of the backup server 70 that has received the instruction hands the instruction to the remote copying control program 79, and further the remote copying control program 79 hands the instruction to the CMD device 111D to be made to execute the pair resynchronization process between the storage apparatuses 10. At this time, in the copy pair control originating with the backup server 70, the instruction is issued to all of the backup target sites, i.e., herein, the copy pairs with the storage apparatuses 110A and 110B on the sites A and B. Thus, data of the copy pair of every site is synchronized with almost the same timing and the process is executed.

In S3, in accordance with the instruction, the pair resynchronization process is actually executed between the storage apparatuses 10. In this operation, differential copying is done for the copy pair based on the differential control. Then, the differential copying is completed in S4 and S5, and respective copy pairs become in the pair synchronized states.

In the pair synchronized state, in S6, the storage apparatus 110D on the site D notifies the remote copying control program 79 in the backup server 70 through the CMD device 111D that the copy resynchronization has been completed. In S7, the job operation program 80 of the backup server 70 notifies the job management program 57 of the management server 50 that the copy resynchronization has been completed.

In S8, at a time when the pair resynchronization of the copy pair has been completed and the data is in the pair synchronized state, the job management program 57 of the management server 50 gives the instruction to execute temporarily data freeze processes to the job operation programs 110A and 110B of the business servers 90A and 90B on the sites A and B that are backup target sites, respectively. The above-mentioned instruction to executing the temporarily data freeze process means "a process for: temporarily suspending the accesses to the logical devices 42A and 42B to be backup targets at that time; and dumping to the disk and reflecting any data that is on the memory of the business servers 90A and 90B and is not reflected in the disk of the storage apparatus 10." The above-mentioned access includes an access for data the input/output in the online business process etc. The disk is an area on the disk drive 32 corresponding to the logical device 42. A process following S8 executes the data copy by using the remote copying function, wherein it is carried out as the temporarily data freeze process of the target data before the backup data is obtained in the copy-destination logical devices ("S") 42DA and 42DB through the pair split.

Also in the above-mentioned process, since the instruction is outputted to the business server 90 on respective backup target sites, data in every site is synchronized with almost the same timing and thus the process can be executed. In accordance with the instruction, the job operation programs 100A and 100B of the business servers 90A and 90B on the respective sites A and B outputs instructions to their respective business programs 98A and 98B. The temporarily data freeze process is executed on the respective sites A and B in accordance with the instructions, and the temporary freeze of data is completed with different points of time depending on the process status or data volume.

In S9 and S19, after execution of the temporarily data freeze process following the S8 is completed, the respective business programs 90A and 90B notify the job management program 57 of the management server 50 that the temporarily data freeze process has been completed, by the job operation programs 100A and 10B. In this embodiment, since a time for the temporarily data freeze process is not synchronized, a notification to the management server 50 takes place with different timing.

In S10 and S20, at a time when the temporarily data freeze process to the data is completed on the respective sites, the job management program 57 of the management server 50 instructs the job operation program 80 of the backup server 70 to carry out the pair split. In S11 and S21, when receiving the instruction, the job operation program 80 of the backup server 70 hands, to the remote copying control program 79, control corresponding to the instruction, and carries out the pair split between the storage apparatuses 10 in accordance with the control of the remote copying control program 79. In S12 and S22, it is shown that due to the pair split, the respective copy pairs are in the pair split states. The pair split is executed individually between the storage apparatus 110D and the storage apparatuses 110A and 110B on the respective backup target sites. As the result of the pair split, the backup data from the systems 1A and 1B are obtained in the system 1D.

In S13 and S23, after the pairs are split, the CMD device 111D notifies the remote copy control program 79 of the backup server 70 that the split of respective pairs is completed. In S14 and S24, the job operation program 80 of the backup server 70 notifies the job management program 57 of the management server 50 that the pair split is completed.

In S15 and S25, the job management program 57 of the backup server 50 not only outputs, to the job operation program 80 of the backup server 70, the instruction of the backup data, but also permits the job operation programs 100A and 100B of the business servers 90A and 90B on the respective backup target sites to resume the accesses to the disks that has been temporarily suspended by the temporarily data freeze process. In response to the permission, from the job operation programs 100A and 100B, the business servers 90A and 90B on the respective sites instruct the business programs 98A and 98B to resume the accesses to the disks.

In S16 and S26, the job operation program 80 gives the instruction to the backup program 78, and thus the backup server 70 backs up the data from the copy-destination logical devices ("S") 42DA and 42DB in the pair split states to the backup device 112 such as a magnetic tape library unit etc. That is, the backup server 70 transfers, to the backup device 112, the backup data obtained from the respective sites A and B that are the backup targets, and stores the transferred data in a memory area of a magnetic tape etc.

After the backup data is stored in the backup device 112 in the S17 and S27, the job operation program 80 of the backup server 70 notifies the job management program 57 of the management server 50 that the storage of the individual backup data has been completed, in S18 and S28. When the management server 50 is notified of completion of storage of the backup data with respect to all of the backup target sites, this means that the backup process at the backup execution point has been completed. The management server 50 records as information on the backup status that the backup process has normally been ended at the backup execution point, etc. When the next backup execution point is reached, the backup process is executed with the same procedure.

In one backup process associated with the backup execution point, it is preferable that a series of processes requires being completed within a time from the backup execution point that is at a start timing of the backup process, at latest to a next backup execution point. If the process of converging into the storage apparatus 110D and obtaining the backup data from the plurality of sites A and B is executed with almost the same synchronized timing, the process of storing each piece of backup data in the subsequent backup device 112 may slightly be delayed in time.

The backup execution point originating from the management server 50 as an origin is determined in accordance with a backup schedule set by the manager 160 etc. The manager 160 sets an interval of every other day or a specific date, etc. to the management server 50 etc. The backup processing shown in this embodiment can be automatically executed if the backup execution point for the plurality of backup target sites has been set in advance.

<Effect and Modified Example>

As described above, in the storage system of the present embodiment, the backup data of the data stored in the storage apparatuses 10 in the system 1 on the plurality of backup target sites is temporally synchronized and converged in the system 1 on one backup execution site. Thus, in any backup target site, the backup is executed at the same point in a time and the same backup management can be applied, not dependent on the plurality of sites contained. In other words, the backup operation/management independent of conditions of the plurality of systems 1 and with almost the same timing, i.e., at the backup execution point becomes possible. In addition, by integration of the backup system onto the backup execution site and convergence of the backup data on the plurality of sites onto one site, the burden of the backup operation/management work can be reduced. The burden on the manager 160 etc. is reduced as compared with the case where the operation/management is executed by individual backup systems on the respective sites since the manager can grasp the backup conditions etc. on the plurality of sites. For example, the manager 160 is relieved of the need to manage the backup schedule for every backup target site or to work while grasping the backup conditions on the respective sites. In addition, this can save the trouble of knowing a relationship among the backup conditions on the respective sites. Note that, whether the backup operation/management for each system takes place individually influences significantly the burden of the manager rather than a geographical distance between the site and the system 1.

In the pair split and the backup data storage operations, in order to resume as quickly as possible the accesses to the disks of the business programs 98A and 98B that have been temporarily suspended due to the temporarily data freeze process, the processes along with each backup target site is individually executed so as to be started from the processable state. That is, in the process of converging the backup data from the respective storage apparatuses 110A and 110B to the storage apparatus 110D, a short time difference is generated due to the temporarily data freeze process. In alternative configuration, control may be executed also in synchronizing the temporarily data freeze process. In this case, the access for the data input/output from the business server 90 is suspended until the respective temporarily data freeze processes are ended on all the backup target sites. Then, after all the temporarily data freeze processes is completed, the next pair split is executed. Thereby, acquisition of each piece of backup data in the storage apparatus 110D is made closer to the timing of storage of the backup data to the backup device 112. In this case, although the time for the backup data storage process to the backup device 112 on the backup execution site can be shortened, a suspended time of the input/output accesses of the host device on the backup target sites becomes longer.

In addition, the remote copying function is a mechanism in which influence of the backup process on performance of the online business process by the business server 90 can be reduced through the copy pair control and the direct data transfer between the storage apparatuses 10. Thus, the backup process of synchronizing the plurality of sites shown in this embodiment during the online business process and converging on the backup data into one site becomes feasible. That is, the online backup processes can be executed. In addition, needless to say, the offline backup process can be executed while the online business process is suspended.

In addition, the backup process can be executed normally even when the number of storage apparatus 10 to be a backup target is only one. Namely, this is the case where the number of storage apparatuses 10 to be a backup target is one at the backup execution point due to some factor, for example, where the process becomes impossible due to a failure that has occurred in the plurality of storage apparatuses to be backup targets in which the backup processes will be originally scheduled.

In addition, the present embodiment is configured so that the storage apparatus 110D itself in the system 1D on the site D that is a backup execution site is not included in the backup targets. There may be adopted such a configuration that the storage apparatus 110D on the backup execution site is also included in the backup target and is subject to the backup process similarly. For example, if two of the storage apparatus 110A and the storage apparatus 110D are subjected to the backup processes, each piece of backup data is obtained in the storage volume in the storage apparatus 110D and stored in the backup device 112, at the backup execution point and with the synchronized timing of the storage apparatus 110A and the storage apparatus 110D.

In addition, the present embodiment has such a configuration that, in the system 1D on the site D that is a backup execution site, the functions associated with the backup process are divided into and provided in the management server 50, the backup server 70, the storage apparatus 110D, and the backup device 112, etc. The present embodiment is limited to the above configuration and may also have such a configuration that the respective functions associated with the above-mentioned backup process are provided by being integrated in a specific device, or by being divided into the separate units. With regard to the functions related to the backup process, there may be adopted such a configuration that the functions that the management server 50, the storage apparatus 110D, and the backup server 70 are all integrated into one storage apparatus 110D. In addition, there may be adopted such a configuration that the functions of the management server 50 and the storage apparatus 110D are integrated into one storage apparatus 110D. Further, there may be adopted such a configuration that the functions of the storage apparatus 110D and the backup server 70 are integrated into one storage apparatus 110D. In addition, there may be adopted such a configuration that the functions of the management server 50 and the backup server 70 are integrated into one server device. Also, there may be adopted such a configuration that each piece of backup data is stored and retained in the memory area of the storage apparatus 110D or other storage apparatus 110, but not in the backup device 112. In addition, similarly on sides on the backup target sites, there may be adopted such a configuration that the functions of the business server 90 and the storage apparatus 110 are provided by being integrated or divided into other devices. For example, there may be adopted such a configuration that the processes are executed similarly by being composed of components such as the job operation program 100 related to the backup process, or the remote copying control program 99 in other server device connected to the LAN 130, but not to the business server 90.

As described above, the invention made by the present inventors has been specifically described based on the embodiments. However, needless to say, the present invention is not limited to the above embodiments and can be variously modified and altered without departing from the gist thereof.

The present invention is available to the information processing system that executes the process for backing up the data stored in the storage apparatus.

What is claimed is:

1. A storage system comprising a backup processing system located at a first site and including a first storage apparatus having a memory unit and a controller and a first information processing system being connected to the first information processing system via a local area network and executing a backup process relating to a plurality of other sites; and a plurality of backup target systems each located at one of said other sites and each including a second information processing system having and a second storage apparatus that stores data to be a backup target, said second storage apparatus being connected to a respective second information processing system via a respective local area network, wherein said first information processing system and said second information processing system are connected through a communication network, and said first information processing system simultaneously backups, at a temporal point for executing said backup process, backup data of said backup target from said second storage apparatus located at said other sites into a memory area in said first information processing system through said communication network and then into said first storage apparatus, by obtaining a temporal synchronization; wherein at a point for executing said backup process, said first information processing system executes a first process for converging said backup data from said second storage apparatus, into said first information processing system by obtaining said temporal synchronization, and for obtaining the converged backup data, and a second process for transferring each piece of backup data obtained in said first information processing system to the memory area in said first information processing system, and for storing the transferred backup data.

2. The storage system according to claim 1, wherein said first information processing system converges backup data of said backup target from said second storage apparatus into said first storage apparatus.

3. The storage system according to claim 1, wherein, at a point for executing said backup process, said first information processing system transmits to a unit in said second information processing system and a unit in said first information processing system, instructions to execute backup at synchronized timing, converges said backup data from said second storage apparatus into said first information processing system in accordance with said instructions by obtaining a synchronization, and obtains the converged backup data.

4. The storage system according to claim 1,
wherein said first and second information processing systems have functions of remotely copying data by copy pair control between said first and second storage apparatuses,
said second storage apparatus executes remote copying of data between said first and second storage apparatuses by using, as a copy pair, a copy-source storage volume of said second storage apparatus and a copy-destination storage volume of said first storage apparatus when obtaining said backup data into said first storage apparatus by executing said backup process during processing of an access for a data input/output from a host device.

5. The storage system according to claim 1, wherein one of said first and second information processing systems, in copy pair control executed at a time of making a remote copy, executes a pair resynchronization process from a pair split state about each copy pair between said first and second storage apparatuses, executes a temporarily data freeze process from a pair synchronized state, and executes a pair split process after said temporarily data freeze process.

6. The storage system according to claim 1, wherein said first information processing system carries out backup operation/management for executing said backup process by setting backup execution points to be equal with respect to the second information processing systems located at said other sites.

7. The storage system according to claim 1, wherein said first information processing system has a backup device for storing said backup data in a memory area of a recoding medium, and executes, in said backup process, a first process for converging said backup data into said first storage apparatus and obtaining the converged backup data and a second process for transferring each piece of backup data obtained in said first storage apparatus to said backup device and storing the transferred backup data in the memory area of said recoding medium.

8. The storage system according to claim 1, wherein said first information processing system includes a backup device for storing said backup data in a memory area of a recoding medium, and a backup server for controlling processes executed by said first storage apparatus and said backup device, and executes, in said backup process in accordance with control of said backup server, a first process for converging said backup data into said first storage apparatus and obtaining the converged backup data, and a second process for transferring each piece of backup data obtained in said first storage apparatus to said backup device and storing the transferred backup data in the memory area of said recording medium.

9. The storage system according to claim 1,
wherein said first information processing system has a management server for implementing integrated control of the entirety of said backup process,
said management server executes a process for transmitting, to a unit in said second information processing system and a unit in said first information processing unit, instructions associated with said backup process, and a process for making accesses to said first and second storage apparatuses to grasp a condition associated with said backup process.

10. The storage system according to claim 1,
wherein a host device communicably connected to said second storage apparatus, and
said host device has the functions of:
executing a routine data input/output operation to said second storage apparatus and controlling a process related to said backup process and executed by said second storage apparatus; and
controlling a process for obtaining said backup data from said second storage apparatus into said first information processing system through said communications network in accordance with an instruction from said first information processing system at a time of said backup process.

11. The storage system according to claim 1, wherein said first information processing system converges thereinto backup data of said backup target by obtaining a temporal synchronization at a time of said backup process, obtains the converged backup data, and stores it in a memory area.

12. The storage system according to claim 1, wherein said first storage apparatus implements integrated control of the entirety of said backup process, and transmits, at a point for executing said backup process, instructions to execute backup to a unit in said second information processing system and a unit in said first information processing system with synchronized timing, and obtains said backup data, and stores it in said memory area.

13. The storage system according to claim 1,
wherein said first information processing system has a backup server for implementing integrated control of the entirety of said backup process, and
said backup server transmits, at a point for executing said backup process, instructions to execute backup to a unit in said second information processing system and a unit in said first information processing system with synchronized timing, and controls obtaining of said backup data and storing of the obtained backup data into said memory area.

14. A storage system comprising a backup processing system located at a first site and including a first storage apparatus having a memory unit and a controller and a first information processing system being connected to the first information processing system via a local area network and executing a backup process relating to a plurality of other sites; and a plurality of backup target systems each located at one of said other sites and each including a second information processing system and a second storage apparatus that stores data to be a backup target, said second storage apparatus being connected to a respective second information processing system via a respective local area network said first and second storage apparatuses have remote copying programs for executing a remote copying process of data by copy pair control between said first and second storage apparatuses, said first information processing system includes a management server for implementing integrated control of the entirety of said backup process, a backup device for storing backup data in a memory area of a recoding medium, and a backup server for controlling processes executed by said first storage apparatus and said backup device, said second information processing system has a host device for controlling a process executed by said second storage apparatus, said management server transmits, at a temporal point for executing said backup process, instructions to execute backup to a unit in said first information processing system and a unit in said second information processing system, and said first information processing system simultaneously backups and converges, in accordance with said instructions, backup data of the backup target into the first storage apparatus from said second storage apparatus located at said other sites through said remote copying process by obtaining a temporal synchronization and obtains the converged backup data, and transfers each piece of obtained backup data to the memory area of said recording medium of said backup device and stores the transferred backup data in the memory area; wherein at a point for executing said backup process, said first information processing system executes a first process for converging said backup data from said second storage apparatus, into said first information processing system by obtaining said temporal synchronization, and for obtaining the converged backup data, and a second process for transferring each piece of backup data obtained in said first information processing system to the memory area in said first information processing system, and for storing the transferred backup data.

15. A method for backing up data between a backup processing system and a plurality of backup target systems, said backup processing system located at a first site and including a first storage apparatus having a memory unit and a controller, and a first information processing system being connected to the first information processing system via a local area network and executing a backup process relating to a plurality of other sites, said plurality of backup target systems each located at one of said other sites and each including a second information processing system and a second storage apparatus that stores data to be a backup target, said second storage apparatus being connected to a respective second information processing system via a respective local area network, said method comprising connecting said first information processing system and said second information processing system through a communication network; and said first information processing system simultaneously backing up, by said first information processing system and at a temporal point for executing said backup process, backup data of said backup target from said second storage apparatus located at said other sites into a memory area in said first information processing system through said communication network and then into said first storage apparatus, by obtaining a temporal synchronization; wherein at a point for executing said backup process, said first information processing system executes a first process for converging said backup data from said second storage apparatus, into said first information processing system by obtaining said temporal synchronization, and for obtaining the converged backup data, and a second process for transferring each piece of backup data obtained in said first information processing system to the memory area in said first information processing system, and for storing the transferred backup data.

16. The method according to claim 15, wherein at a point for executing said backup process, said first information processing system executes:

a first process for converging said backup data from said second storage apparatus, into said first information processing system by obtaining said temporal synchronization, and for obtaining the converged backup data, and a second process for transferring each piece of backup data obtained in said first information processing system to the memory area in said first information processing system, and for storing the transferred backup data.

* * * * *